US012645242B2

(12) United States Patent
Park et al.

(10) Patent No.: US 12,645,242 B2
(45) Date of Patent: Jun. 2, 2026

(54) CURRENT MIRROR CIRCUIT AND NEUROMORPHIC DEVICE INCLUDING SAME

(71) Applicant: SEOUL NATIONAL UNIVERSITY R&DB FOUNDATION, Seoul (KR)

(72) Inventors: Byung-Gook Park, Seoul (KR); Jong Hyuk Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 805 days.

(21) Appl. No.: 17/978,733

(22) Filed: Nov. 1, 2022

(65) Prior Publication Data

US 2023/0135734 A1 May 4, 2023

Related U.S. Application Data

(63) Continuation of application No. PCT/KR2022/013961, filed on Sep. 19, 2022.

(30) Foreign Application Priority Data

Nov. 4, 2021 (KR) ........................ 10-2021-0150804
Jun. 14, 2022 (KR) ........................ 10-2022-0072160

(51) Int. Cl.
*G05F 3/26* (2006.01)
*G06N 3/04* (2023.01)

(52) U.S. Cl.
CPC .............. *G05F 3/262* (2013.01); *G06N 3/04* (2013.01)

(58) Field of Classification Search
CPC ................................. G05F 3/262; G06N 3/04

USPC ........................................................ 363/315
See application file for complete search history.

(56) References Cited

U.S. PATENT DOCUMENTS

| | | | | |
|---|---|---|---|---|
| 8,829,882 B2 * | 9/2014 | Willey | ..................... | G05F 3/20 |
| | | | | 323/315 |
| 9,740,232 B2 * | 8/2017 | Wu | .......................... | G05F 3/267 |
| 9,990,580 B2 * | 6/2018 | Eleftheriou | ........ | G11C 13/0069 |
| 10,996,698 B2 * | 5/2021 | Sung | ...................... | H03K 19/20 |
| 2016/0320790 A1 * | 11/2016 | Wu | .......................... | G05F 3/267 |
| 2017/0193364 A1 * | 7/2017 | Lee | ......................... | G06N 3/063 |
| 2017/0222548 A1 * | 8/2017 | Takada | .................. | H02M 3/155 |
| 2017/0243108 A1 * | 8/2017 | Ritter | ..................... | G05F 3/262 |
| 2018/0181856 A1 * | 6/2018 | Lee | ......................... | G06N 3/063 |
| 2021/0304005 A1 * | 9/2021 | Davies | .................. | G06N 3/088 |

FOREIGN PATENT DOCUMENTS

| | | |
|---|---|---|
| JP | 4941045 B2 | 5/2012 |
| JP | 5035350 B2 | 9/2012 |
| JP | 5388767 B2 | 1/2014 |
| JP | 6453553 B2 | 1/2019 |
| KR | 20010104198 | 11/2001 |
| KR | 20030000478 | 1/2003 |
| KR | 20070026041 | 3/2007 |

(Continued)

*Primary Examiner* — Yemane Mehari
(74) *Attorney, Agent, or Firm* — CANTOR COLBURN LLP

(57) ABSTRACT

Provided is a current mirror circuit and a neuromorphic device including the current mirror circuit and provides a current mirror circuit that causes an ideal current to flow through the current mirror circuit by using a compensation circuit, and a neuromorphic device including the current mirror circuit.

4 Claims, 6 Drawing Sheets

(56)           References Cited

FOREIGN PATENT DOCUMENTS

| KR | 20160095427 A | 8/2016 |
| KR | 20170091039 | 8/2017 |
| KR | 102026332 | 9/2019 |
| KR | 102092233 | 3/2020 |
| KR | 102224320 | 3/2021 |
| KR | 20210022890 | 3/2021 |

* cited by examiner

*Prior Art*

*FIG. 5*

CURRENT MIRROR CIRCUIT AND NEUROMORPHIC DEVICE INCLUDING SAME

BACKGROUND

1. Field

Embodiments of the present disclosure relate to a current mirror circuit, and more particularly, to a current mirror circuit that is applicable to a neuromorphic device.

2. Description of the Related Art

Recently, research and development of a spiking neural network (SNN) has been actively conducted along with development of a computing technology based on an artificial neural network. Although the SNN started from imitation of a real biological nervous system (concepts of memory, learning, and inference) and adopts a similar network structure but is different from the real biological nervous system in various aspects such as signal transmission, information expression method, and learning method.

Meanwhile, a learning method that outperforms the known neural network has not been developed yet, and thus, a hardware-based SNN, which operates almost identically to the real nervous system, is rarely used in the real industry. However, if synaptic weights are derived by using the known neural network and inferred by using the SNN method, a high-accuracy and ultra-low-power computing system may be implemented, and thus, research on this is being actively conducted.

In order to implement a neural network including SNN in hardware, a current mirror circuit may be used. As illustrated in FIG. 1, the known current mirror circuit is implemented by using two metal oxide semiconductor fiend effect transistor (MOSFETs). In the known current mirror circuit, as a current to flow therethrough increases, a voltage of an input node increases.

As the voltage of the input node of the current mirror circuit increases, a current less than an ideal current to be generated by the current mirror circuit is generated. Accordingly, in the case of the known current mirror circuit, as the voltage of the input node increases, linearity is reduced. Accordingly, it is difficult to apply a general current mirror circuit to a neuromorphic device in which a neural network is implemented in hardware.

SUMMARY

A current mirror circuit and a neuromorphic device including the current mirror circuit according to an embodiment of the present disclosure is improved in linearity of the current mirror circuit even when a voltage of an input node increases.

However, the technical object to be achieved by the present embodiment is not limited to the above-described technical object, and there may be other technical objects.

According to an aspect of the present disclosure, a current mirror circuit includes a first switching element having a first terminal to which a power supply voltage is applied, a second terminal that is grounded, and a third terminal diode-connected to the first terminal, a second switching element having a second terminal that is grounded and a third terminal connected to the third terminal of the first switching element, and a compensation circuit connected in parallel to the second switching element, wherein the compensation circuit compensates for a current corresponding to a difference between an ideal current of the current mirror circuit corresponding to the power supply voltage and an actual current flowing through the current mirror circuit to cause an ideal current corresponding to the power supply voltage to flow through the current mirror circuit.

In addition, the compensation circuit according to an embodiment of the present disclosure includes at least one third switching element having a first terminal connected to a first terminal of the second switching element, a second terminal that is grounded, and a third terminal connected to a connection node between the third terminal of the first switching element and the third terminal of the second switching element.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a compensation current graph of a compensation circuit according to an embodiment of the present disclosure.

DETAILED DESCRIPTION

Figure 1:
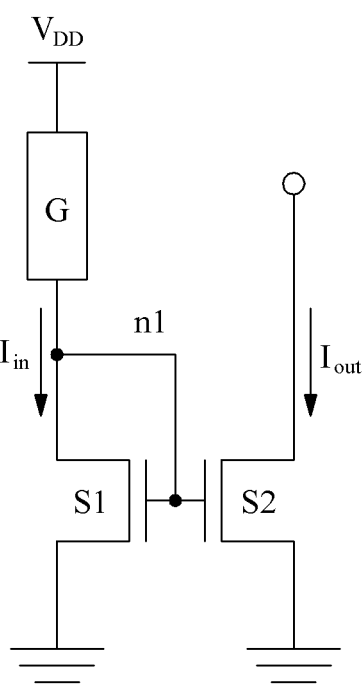
FIG. 1 is a circuit diagram of the known current mirror circuit.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" or "coupled" to another portion, this includes not only a case of being "directly connected or coupled" but also a case of being "electrically connected" with another element interposed therebetween. In addition, when a portion "includes" a certain component, this means that other components may be further included therein rather than excluding other components, unless otherwise stated.

Throughout this specification, when a member is located "on" another member, this includes not only a case in which a member is in contact with another member but also a case in which there is another member between the two members.

In addition, the accompanying drawings are only for easy understanding of the embodiments disclosed in the present specification, and the technical idea disclosed herein is not limited by the accompanying drawings, and the present disclosure should be understood to include all changes, equivalents, and substitutes included in the idea and scope of the present disclosure.

Terms including ordinal numbers such as first, second, and so on may be used to describe various components, but the components are not limited by the terms. The terms are used only for the purpose of distinguishing one component from another component.

When a component is referred to as being "connected" or "coupled" to another component, the component may be directly connected thereto or coupled thereto, but it is understood that another component may exist therebetween. Meanwhile, when it is described that a certain element is "directly connected" or "directly coupled" to another element, it should be understood that there is no component therebetween.

The singular expression includes the plural expression unless the context clearly states otherwise.

In the present application, terms such as "include", "comprise", or "have" are intended to designate that there are features, numbers, steps, operations, components, portions, or combination thereof described in the specification, and it should be understood that the terms do not preclude a possibility of addition or existence of one or more other features, numbers, steps, operations, components, portions, or combinations thereof.

Hereinafter, a current mirror circuit according to an embodiment of the present disclosure will be described with reference to FIGS. 2 and 3.

Figure 2:
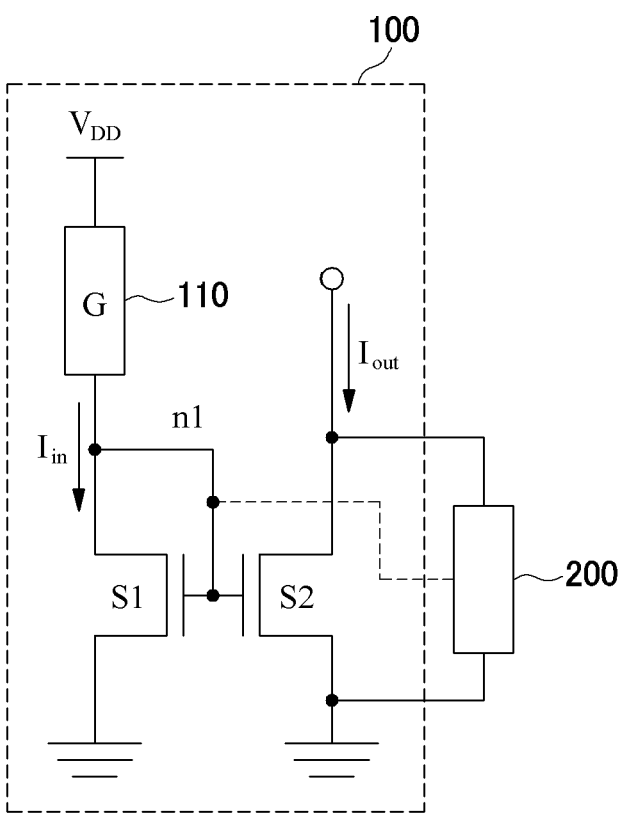
FIG. 2 is a conceptual diagram of a current mirror circuit according to an embodiment of the present disclosure.
Figure 3:
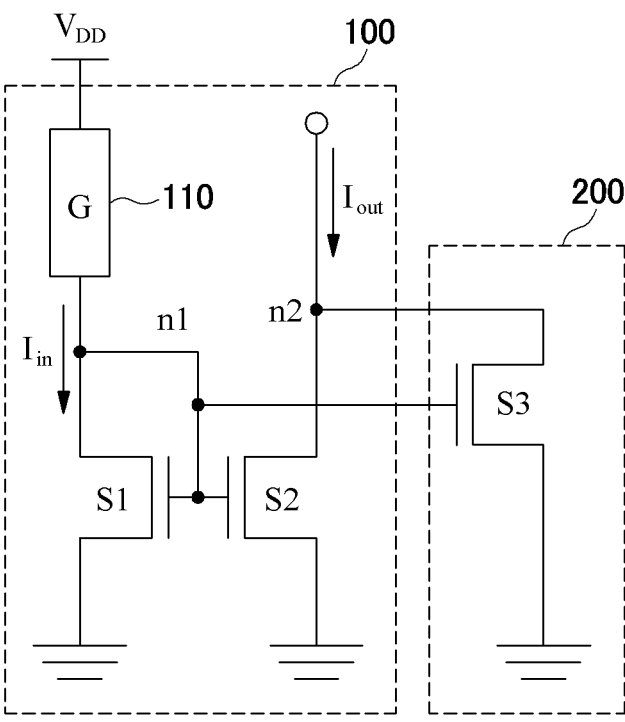
FIG. 3 is a circuit diagram of a current mirror circuit according to an embodiment of the present disclosure.

As illustrated in FIG. 2, a current mirror circuit 1 according to an embodiment of the present disclosure has a structure in which a compensation circuit 200 is added to the known current mirror 100. The compensation circuit 200 is connected in parallel to the current mirror 100 and causes a compensation current corresponding to a current (an ideal current—an actual current) of the current mirror 100 which is distorted due to a change in voltage of an input node n1 to flow, and thus, linearity of the current mirror 100 is improved.

In the current mirror 100, a conductance unit G or 110 may correspond to a conductance value of a configuration connected to the first node n1. Accordingly, the conductance unit 110 may indicate a conductance value of a circuit or a device connected to the first node n1.

The current mirror circuit 1 according to the embodiment of the present disclosure includes a first switching element S1, a second switching element S2, and a compensation circuit. The first switching element S1 includes a first terminal to which a power supply voltage is applied, a second terminal which is grounded, and a third terminal which is diode-connected to the first terminal. A second terminal of the second switching element S2 is grounded, and a third terminal of the second switching element S2 is connected to the third terminal of the first switching element S1.

The first switching element S1 and the second switching element S2 may each use a metal oxide semiconductor fiend effect transistor (MOSFET) or an NMOS transistor. However, the present disclosure is not limited thereto, and other types of switching elements may be used.

When the first switching element S1 and the second switching element S2 use NMOS transistors, the first switching element S1 has a drain connected to the first node n1, a gate connected to the first node n1, and a source connected to the ground. The second switching element S2 has a gate connected to the first node n1, a drain connected to a second node n2, and a source connected to the ground.

As described above, the gates of the first switching element S1 and the second switching element S2 have the same voltage values as and the sources thereof. Accordingly, a current is copied according to a ratio between channel widths W of the first switching element S1 and the second switching element S2.

However, a specific circuit configuration of the current mirror 100 according to the embodiment of the present disclosure is an example and may be implemented by other known circuits.

The compensation circuit 200 is connected in parallel to the second switching element S2 and compensates for a current corresponding to a difference between an ideal current of the current mirror 100 which corresponds to the power supply voltage and an actual current flowing through the current mirror 100, and thus, an ideal current corresponding to the power supply voltage flows through the current mirror 100.

The compensation circuit 200 may include a third switching element S3 connected in parallel to the second switching element S2. The third switching element S3 has a first terminal connected to the first terminal of the second switching element, a second terminal that is grounded, and a third terminal connected to a connection node between the third terminal of the first switching element S1 and the third terminal of the second switching element S2.

The third switching device S3 may use a MOSFET or an NMOS transistor. However, the present disclosure is not limited thereto, and other types of switching elements may be used therefor.

When the compensation circuit 200 uses an NMOS transistor, the third switching element S3 has a gate coupled to the first node n1, a drain coupled to a second node n2, and a source connected to the ground.

In this case, the first switching element S1 and the second switching element S2 constituting the current mirror 100 have short channels, and the third switching element S3 has a long channel.

In addition, the compensation circuit 200 may include a structure in which a plurality of switching elements are connected in parallel to the current mirror 100 in addition to a structure in which one switching element is connected in parallel to the current mirror 100. Accordingly, the third switching element S3 may indicate a plurality of switching elements.

When a current $I_{in}$ input to the current mirror 100 increases, a voltage of the first node n1 increases. Even when the voltage of the first node n1 increases, the compensation circuit 200 additionally causes a distorted current to flow, and thus, linearity of the current mirror circuit 1 may be improved.

That is, the compensation circuit compensates for a current corresponding to a difference between an ideal current of the current mirror circuit which corresponds to the power supply voltage and an actual current flowing through the current mirror circuit, and thus, the ideal current corresponding to the power supply voltage flows through the current mirror circuit.

Accordingly, the current mirror circuit 1 according to the embodiment of the present disclosure generates an ideal current corresponding to the power supply voltage, and thus, ideal power is consumed in terms of power consumption.

Hereinafter, linearity of the current mirror circuit 1 according to the embodiment of the present disclosure will be described with reference to FIG. 4.

Figure 4:
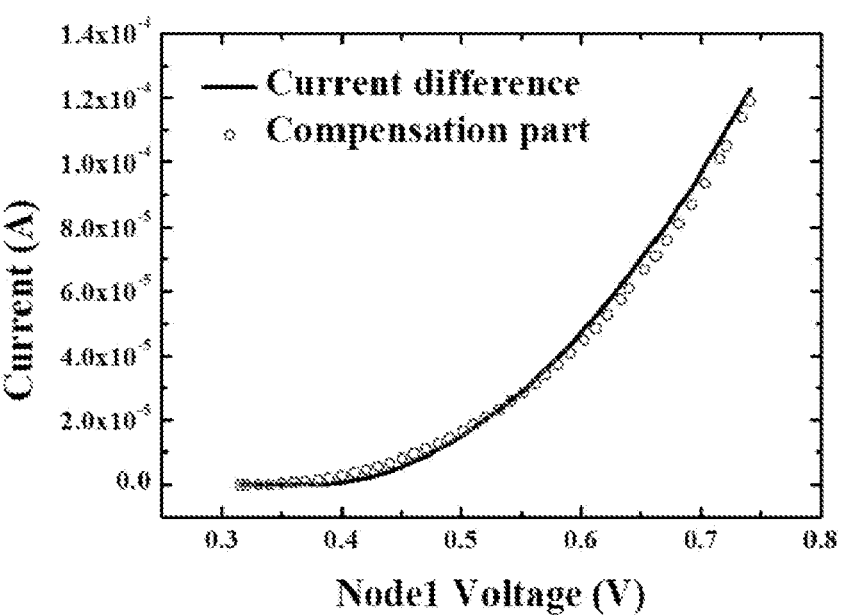
FIG. 4 is a characteristic graph of a current mirror circuit according to an embodiment of the present disclosure.

FIG. 4 illustrates ideal current characteristics Ideal of a current mirror circuit, current characteristics Compensated of the current mirror circuit 1 according to the embodiment of the present disclosure, and current characteristics Uncompensated of the known current mirror circuit 100.

As illustrated in FIG. 4, in the known current mirror circuit 100, when the ideal current increases, linearity between the ideal current and the generated current Drain Current is reduced.

The current mirror circuit 1 according to an example embodiment of the present disclosure may be connected to the compensation circuit 200 to compensate for a distorted current. Accordingly, even when the ideal current increases, linearity between the ideal current and the generated current Drain Current is maintained.

Figure 5:
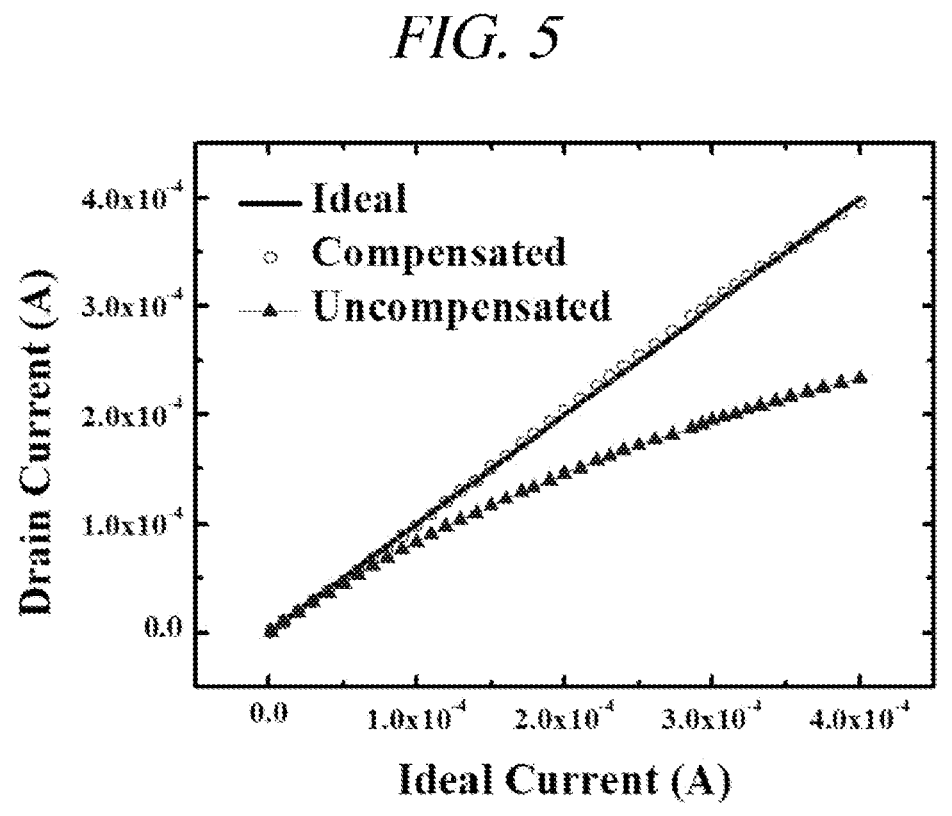

Hereinafter, FIG. 5 illustrates a compensation current of the compensation circuit 200 according to an embodiment of the present disclosure.

As illustrated in FIG. 4, a voltage of the first node n1 may be adjusted in a range of 0.3 V to 0.8 V. A graph of FIG. 5 illustrates a difference between an ideal current and an actual current of the current mirror circuit according to the voltage of the first node n1. That is, when the voltage of the first node n1 increases, the difference between the ideal current and the actual current of the current mirror circuit 100 increases.

Accordingly, the compensation circuit 200 allows a compensation current corresponding to the difference between the ideal current and the actual current illustrated in FIG. 5 to flow. That is, the compensation circuit 200 allows more compensation current to flow as the voltage of the first node n1 increases, and thus, linearity of the current mirror circuit 1 increases.

Specifically, an operation of the current mirror circuit 1 according to the embodiment of the present disclosure may be represented by using the following equations. First, an ideal current that needs to flow through the current mirror 100 may be derived by using Equation 1. In addition, an actual current flowing through the current mirror 100 may be derived by using Equation 2.

$$I_{in,ideal} = G(V_{DD} - V_{th})$$

Equation 1

Here, $I_{in,ideal}$ is an ideal current that needs to flow to an input terminal of the current mirror circuit 100, $V_{DD}$ is a power supply voltage, and Vth is a threshold voltage of the first switching element S1 and the second switching element S2, G indicates a conductance value of a device or a circuit connected to the first node n1.

$$I_{in,ideal} = G(V_{DD} - V_{n1})$$

$$= G_1(V_{n1} - V_{th})$$

Equation 2

Here, $I_{in,real}$ is an actual current flowing through the input terminal of the current mirror 100, $V_{DD}$ is the power supply voltage value, Vn1 is a voltage of the first node n1, and G1 is a transconductance value of the first switching element S1. The voltage of the first node is obtained by Equation 2 is represented by following Equation 3.

$$V_{n1} = \frac{GV_{DD} + G_1 V_{th}}{G + G_1}$$

Equation 3

By inserting Equation 3 into Equation 2 and using Equation 1, following Equation 4 may be derived.

$$I_{in,ideal} = \frac{I_{in,ideal} I_{in,max}}{I_{in,ideal} + I_{in,max}}$$

Equation 4

Here, $I_{in,max}$ is a maximum current flowing through the input terminal of the current mirror 100 and may be derived by Equation 5 below.

$$I_{in,max} = G_1(V_{DD} - V_{th})$$

Equation 5

By using the same method as the method of deriving the input current $I_{in,max}$, Equation 6 below related to an output current $I_{out,max}$ may be derived.

$$I_{out,ideal} = \frac{G_2}{G_1} I_{in,ideal} = \frac{G_2 G}{G_1}(V_{DD} - V_{th})$$

Equation 6

$$I_{out,real} = G_2(V_{n1} - V_{th})$$

$$I_{out,max} = G_2(V_{DD} - V_{th})$$

$$I_{out,real} = \frac{I_{out,ideal} I_{out,max}}{I_{out,ideal} + I_{out,max}}$$

Here, $I_{out,real}$ is an actual current flowing through an output terminal of the current mirror 100, $V_{DD}$ is the power supply voltage, Vn1 is the voltage of the first node n1, and G2 is a transconductance value of the second switching element S2.

Accordingly, it is necessary to compensate as much as the difference between a current that has to ideally flow and a current that actually flows. Equation 7 below may be used to derive a compensation current $I_{compensation}$.

$$I_{compensation} = I_{out,ideal} - I_{out,real} = \frac{I_{out,ideal}^2}{I_{out,ideal} + I_{out,max}}$$

Equation 7

In addition, by approximating Equation 7 as a quadratic expression, Equation 8 below may be derived. Accordingly, a long channel MOSFET may be used as a compensation circuit.

$$I_{compensation} = G_3(V_{n1} - V_{th})^2$$

Equation 8

Here, G3 is a transconductance value of the third switching element S3 included in the compensation circuit.

As described above, the compensation circuit compensates for a current corresponding to a difference between an ideal current of a current mirror circuit and an actual current flowing through the current mirror circuit, and thus, the ideal current may flow through the current mirror circuit.

Hereinafter, a structure of a neuromorphic device to which the current mirror circuit according to the embodiment of the present disclosure is applied will be described with reference to FIG. 6.

The neuromorphic device may include a synapse 300 connected to an input terminal of the current mirror circuit, and an ignition unit 400 connected to an output terminal of the current mirror circuit.

The synapse 300 is implemented in the form of a synaptic array including a plurality of synaptic elements and may be implemented to have substantially the same shape. The synaptic array is implemented to perform the same function as a brain synapse and is generally implemented based on a non-volatile memory device.

The synaptic array corresponds to a plurality of synaptic cells and stores a predetermined weight. The synaptic array may include a front-end neuron circuit and a rear-end neuron circuit and include synaptic cells corresponding to a product of the number of front-end neuron circuits and the number of rear-end neuron circuits.

An operation of storing a weight in the synaptic array or a process of reading the stored weight is performed by the same principle as a program operation or a read operation performed by a general non-volatile memory device. Here, the weight means a weight that is multiplied by an input signal in a perceptron structure representing an artificial neural network model and is additionally defined as a concept including a bias that is a special weight with an input of 1.

The current mirror 100 stores a signal transmitted through the synapse 300 in a charging element such as a capacitor. The ignition unit 400 generates a spike when a charging voltage of the charging element exceeds a certain level.

As described above, by connecting the compensation circuit 200 to the current mirror 100 in parallel, linearity of the current mirror 100 may be improved. Accordingly, operation accuracy and performance of the neuromorphic device may also be improved.

Figure 6:
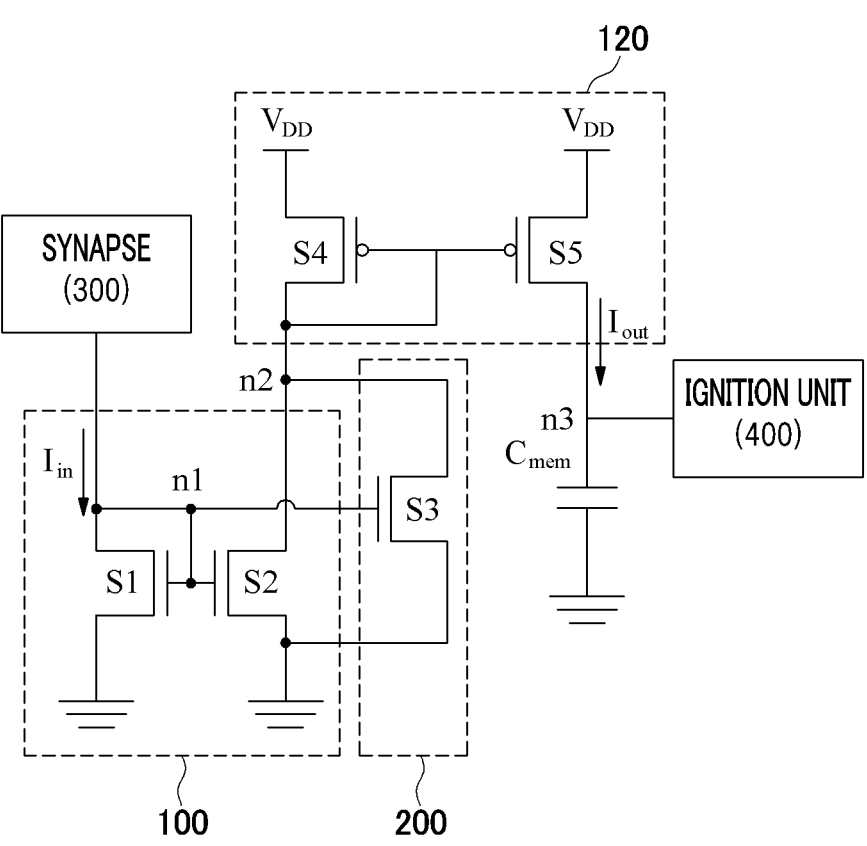
FIG. 6 is a circuit diagram of a neuromorphic device to which a current mirror circuit is applied, according to an embodiment of the present disclosure.

Specifically, as illustrated in FIG. 6, the neuromorphic device may include one or more of the synapse 300, the first current mirror circuit 100, the compensation circuit 200, a second current mirror circuit 120, a capacitor $C_{mem}$, and the ignition unit 400.

The synapse 300 is connected to a first node n1 that is an input terminal of the first current mirror circuit 100. The first current mirror circuit 100 includes a first switching element S1 and a second switching element S2. Accordingly, an output terminal of the synapse 300 is connected to a first terminal of the first switching element S1.

The first switching element S1 has the first terminal connected to the output terminal of the synapse 300, a second terminal that is grounded, and a third terminal that is diode-connected to the first terminal. The second switching element S2 has a second terminal that is grounded and a third terminal connected to the third terminal of the first switching element.

As described above, the first switching element S1 and the second switching element S2 may each use a MOSFET or an NMOS transistor. When the first switching device S1 and the second switching device S2 each use the NMOS transistor, a first drain terminal and a first gate terminal of the first switching element S1 are connected to the first node n1 and, and a first source terminal thereof is connected to the ground. The second switching element S2 has a second gate terminal connected to the first node n1, a second drain terminal connected to a second node n2, and a second source terminal connected to the ground.

The compensation circuit 200 may include a third switching element S3 connected in parallel to the second switching element S2. The third switching element S3 may use the same switching element as in the first current mirror circuit 100. Accordingly, the third switching element S3 may use a MOSFET or an NMOS transistor.

When the compensation circuit 200 uses the NMOS transistor, the third switching element S3 has a third gate terminal connected to the first node n1, a third drain terminal connected to the second node n2, and a third source terminal connected to the ground.

In this case, the first switching element S1 and the second switching element S2 constituting the current mirror 100 have short channels, and the third switching element S3 has a long channel.

In addition, the third switching element S3 may include a plurality of switching elements instead of one switching element. That is, the compensation circuit 200 may include not only a structure consisting of one switching element but also a structure in which a plurality of switching elements are connected in parallel to each other.

The second current mirror circuit 120 is connected to an output terminal of the first current mirror circuit 100. The second current mirror circuit 120 may include the third switching element S3 to which a current flowing through the second switching element S2 of the first current mirror circuit 100 is input, and a fourth switching element S4 through which a current of the third switching element S3 is copied to flow The fourth switching element S4 and a fifth switching element S5 may be different types of switching elements from the switching element used in the first current mirror circuit 100. Accordingly, the fourth switching element S4 and the fifth switching element S5 may each use a PMOS transistor. However, the present disclosure is not limited thereto, and other types of switching elements may be used.

When the fourth switching element S4 and the fifth switching element S5 each use the PMOS transistor, the fourth switching element S4 has a fourth drain terminal connected to the power supply voltage $V_{DD}$, and a fourth gate terminal and a fourth source terminal connected to the second node n2. The fifth switching element S5 has a fifth drain terminal connected to the power supply voltage $V_{DD}$, a fifth gate terminal connected to the second node n2, and a fifth source terminal connected to a third node n3.

A capacitor $C_{mem}$ may accumulate and store an output signal of the synapse 300. Specifically, the output signal of the synapse 300 may be accumulated in the capacitor $C_{mem}$ through the first current mirror circuit 100 and the second current mirror circuit 120. That is, the capacitor $C_{mem}$ may accumulate an output current of a synaptic array.

The capacitor $C_{mem}$ has one terminal connected to an output terminal of the second current mirror circuit 120 and the other terminal that is grounded. That is, the capacitor $C_{mem}$ has one terminal connected to the third node n3 and the other terminal connected to the ground.

When a charging voltage of the capacitor $C_{mem}$ is higher than or equal to a certain level, the ignition unit 400 may generate a spike and transmit the spike to a next neuron circuit. The ignition unit 400 and a synapse of the next neuron circuit are connected in series to the third node n3. That is, the ignition unit 400 has an input terminal connected to the output terminal of the second current mirror circuit 120, and the other terminal connected to the synapse of the next neuron circuit.

As described above, in a neuromorphic device or an SNN circuit, when a weight sum obtained by multiplying a weight value stored in each synapse by an input value is transmitted by using the current mirror circuit 100, an ideal current may flow through the current mirror circuit by adding the compensation circuit 200 to the current mirror circuit 100. Accordingly, operation accuracy and performance of the neuromorphic device or the SNN circuit may be improved.

A current mirror circuit and a neuromorphic device including the current mirror circuit according to an embodiment of the present disclosure may improve linearity of the current mirror circuit even when a voltage of an input node thereof increases.

An embodiment of the present disclosure may also be implemented in the form of a recording medium including instructions executable by a computer, such as a program module executed by the computer. Computer-readable media may be any available media that may be accessed by a computer and include both volatile and nonvolatile media and removable and non-removable media. In addition, the computer-readable media may include all computer storage media. The computer storage media includes both volatile and nonvolatile media and removable and non-removable media implemented by any method or technology of storing information, such as a computer readable instruction, a data structure, a program module, and other data.

Although the method and system according to the present disclosure are described with reference to specific embodiments, some or all of their components or operations may be implemented by using a computer system having a general-purpose hardware architecture.

The above descriptions on the present disclosure are for illustration, and those skilled in the art to which the present disclosure pertains may understand that the descriptions may be easily modified into other specific forms without changing the technical idea or essential features of the present disclosure. Therefore, it should be understood that the embodiments described above are illustrative in all respects and not restrictive. For example, each component described as a single type may be implemented in a dispersed form, and likewise components described as distributed may be implemented in a combined form.

The scope of the present disclosure is indicated by the following claims rather than the above detailed description, and all changes or modifications derived from the meaning and scope of the claims and their equivalents should be interpreted as being included in the scope of the present disclosure.

MODE FOR IMPLEMENTING THE INVENTION

The mode for implementing the present disclosure is the same as the best mode for implementing the present disclosure described above.

INDUSTRIAL APPLICABILITY

The present disclosure may be used in a neuromorphic related industry as a neuromorphic device technology, thereby having industrial applicability.

What is claimed is:

1. A current mirror circuit comprising:
a first switching element having a first terminal to which a power supply voltage is applied, a second terminal that is grounded, and a third terminal diode-connected to the first terminal;
a second switching element having a second terminal that is grounded and a third terminal connected to the third terminal of the first switching element; and
a compensation circuit connected in parallel to the second switching element,
wherein the compensation circuit comprises at least one third switching element having a first terminal connected to a first terminal of the second switching element, a second terminal that is grounded, and a third terminal connected to a connection node between the third terminal of the first switching element and the third terminal of the second switching element,
the first switching element, the second switching element, and the third switching element each include a MOSFET, and
the first switching element and the second switching element each has a short channel, and the third switching element has a long channel, and
wherein the compensation circuit compensates for a current corresponding to a difference between an ideal current of the current mirror circuit corresponding to the power supply voltage and an actual current flowing through the current mirror circuit to cause an ideal current corresponding to the power supply voltage to flow through the current mirror circuit and when the input current input through the first terminal of the first switching element increases, the voltage of the third terminal of the first switching element increases, and as the voltage of the third terminal increases, the compensation circuit allows more compensation current to flow.

2. A neuromorphic device, comprising:
a synapse;
a first current mirror circuit;
a second current mirror circuit;
a capacitor; and
an ignition unit,
wherein the first current mirror circuit includes a first switching element having a first terminal connected to an output terminal of the synapse, a second terminal that is grounded, and a third terminal diode-connected to the first terminal, a second switching element having a second terminal that is grounded and a third terminal connected to the third terminal of the first switching element, and a compensation circuit connected in parallel to the second switching element, and
wherein the second current mirror circuit includes a third switching element to which a current flowing through the second switching element of the first current mirror circuit is input; and a fourth switching element through which a current of the third switching element is copied to flow, and
the compensation circuit compensates for a current corresponding to a difference between an ideal current of the current mirror circuit corresponding to a power supply voltage and an actual current flowing through the current mirror circuit to cause an ideal current corresponding to the power supply voltage to flow through the current mirror circuit.

3. The neuromorphic device of claim 2, wherein the compensation circuit comprises at least one third switching element having a first terminal connected to a first terminal of the second switching element, a second terminal that is grounded, and a third terminal connected to a connection node between the third terminal of the first switching element and the third terminal of the second switching element.

4. The neuromorphic device of claim 3, wherein the first switching element, the second switching element, and the third switching element each include a MOSFET,
the first switching element and the second switching element each have a short channel, and
the third switching element has a long channel.

* * * * *